(12) United States Patent
Choi et al.

(10) Patent No.: US 8,871,406 B2
(45) Date of Patent: Oct. 28, 2014

(54) HIGHLY PROTON CONDUCTIVE CROSSLINKED VINYLSULFONIC ACID POLYMER ELECTROLYTE COMPOSITE MEMBRANES AND ITS PREPARATION METHOD FOR POLYMER ELECTROLYTE FUEL CELLS

(75) Inventors: Young Woo Choi, Chungcheongbuk-Do (KR); Chang Soo Kim, Incheon (KR); Gu Gon Park, Daejeon (KR); Seok Hee Park, Daejeon (KR); Sung Dae Lim, Daejeon (KR); Tae Hyun Yang, Daejeon (KR); Young Gi Yoon, Daejeon (KR); Min Jin Kim, Daejeon (KR); Kyoung Youn Kim, Daejeon (KR); Young Jun Sohn, Daejeon (KR); Won Yong Lee, Daejeon (KR); Mi-Soon Lee, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 643 days.

(21) Appl. No.: 12/935,257

(22) PCT Filed: Dec. 23, 2008

(86) PCT No.: PCT/KR2008/007598
§ 371 (c)(1),
(2), (4) Date: Nov. 23, 2010

(87) PCT Pub. No.: WO2009/131294
PCT Pub. Date: Oct. 29, 2009

(65) Prior Publication Data
US 2011/0059387 A1   Mar. 10, 2011

(30) Foreign Application Priority Data
Apr. 25, 2008   (KR) .................. 10-2008-0038882

(51) Int. Cl.
*H01M 8/10*   (2006.01)
*C08J 5/22*   (2006.01)

(52) U.S. Cl.
CPC ............ *C08J 5/2231* (2013.01); *H01M 8/1023* (2013.01); *H01M 8/1062* (2013.01); *H01M 8/1072* (2013.01); *H01M 8/106* (2013.01); *Y02E 60/523* (2013.01); *C08J 2323/06* (2013.01)
USPC ........... 429/492; 429/493; 429/254; 429/249; 526/225

(58) Field of Classification Search
CPC ...................................................... H01M 8/10
USPC ............ 429/33, 492, 493, 254, 249; 526/225
See application file for complete search history.

(56) References Cited

U.S. PATENT DOCUMENTS

| 5,225,062 | A  | * | 7/1993 | Yoshioka et al. | 204/469 |
|-----------|----|---|--------|-----------------|---------|
| 7,097,940 | B2 | * | 8/2006 | Uetani et al.   | 429/303 |
| 2002/0012848 | A1 | * | 1/2002 | Callahan et al. | 429/306 |
| 2008/0199755 | A1 | * | 8/2008 | Brotherston et al. | 429/33 |
| 2009/0297909 | A1 | * | 12/2009 | Yamamoto et al. | 429/33 |

FOREIGN PATENT DOCUMENTS

WO   WO 2006/059582   *   6/2006   .............. H01B 1/06

* cited by examiner

*Primary Examiner* — Patrick Ryan
*Assistant Examiner* — Alex Usyatinsky
(74) *Attorney, Agent, or Firm* — Rabin & Berdo, P.C.

(57) ABSTRACT

A highly proton conductive polymer electrolyte composite membrane for a fuel cell is provided. The composite membrane includes crosslinked polyvinylsulfonic acid. The composite membrane is produced by impregnating a mixed solution of vinylsulfonic acid as a monomer, a hydroxyl group-containing bisacrylamide as a crosslinking agent and a photoinitiator or thermal initiator into a microporous polymer support, polymerizing the monomer, and simultaneously thermal-crosslinking or photo-crosslinking the polymer to form a chemically crosslinked polymer electrolyte membrane which is also physically crosslinked with the porous support. Further provided is a method for producing the composite membrane in a simple manner at low cost as well as a fuel cell using the composite membrane.

8 Claims, 2 Drawing Sheets

(a)

(b)

(c)

HIGHLY PROTON CONDUCTIVE CROSSLINKED VINYLSULFONIC ACID POLYMER ELECTROLYTE COMPOSITE MEMBRANES AND ITS PREPARATION METHOD FOR POLYMER ELECTROLYTE FUEL CELLS

CROSS-REFERENCES TO RELATED APPLICATIONS

This application is a U.S. national phase application, pursuant to 35 U.S.C. §371 of PCT/KR2008/007598, filed Dec. 23, 2008, designating the United States, which claims priority to Korean Application No. 10-2008-0038882, filed Apr. 25, 2008. The entire contents of the aforementioned patent applications are incorporated herein by this reference.

TECHNICAL FIELD

The present invention relates to a highly proton conductive polymer electrolyte composite membrane for a fuel cell which includes crosslinked polyvinylsulfonic acid, a method for producing the composite membrane, and a fuel cell using the composite membrane. More specifically, the present invention relates to a highly proton conductive polymer electrolyte composite membrane for a fuel cell that is produced by impregnating a mixed solution of vinylsulfonic acid as a monomer, a hydroxyl group-containing bisacrylamide as a crosslinking agent and a photoinitiator or thermal initiator into a microporous polymer support, polymerizing the monomer, and simultaneously thermal-crosslinking or photo-crosslinking the polymer to form a chemically crosslinked polymer electrolyte membrane which is also physically crosslinked with the porous support. The present invention also relates to a method for producing the composite membrane in a simple manner at low cost as well as a fuel cell using the composite membrane

BACKGROUND ART

In general, fuel cells are broadly classified into alkaline fuel cells (AFCs), phosphoric acid fuel cells (PAFCs), molten carbonate fuel cells (MCFCs), solid oxide fuel cells (SOFCs), direct methanol fuel cells (DMFCs) and polymer electrolyte membrane fuel cells (PEMFCs) by the kind of electrolyte that they employ.

Of these fuel cells, polymer fuel cells and direct methanol fuel cells use polymers as electrolytes to avoid the risk of corrosion by the electrolytes or evaporation of the electrolytes. Further, polymer fuel cells and direct methanol fuel cells provide much better output characteristics due to their higher current density per unit area and require lower operating temperatures than the other kinds of fuel cells. Based on these advantages, polymer fuel cells and direct methanol fuel cells are actively being developed for a variety of applications, including transportable power sources for automotive vehicles, distributed power sources (on-site) for houses and public buildings, and small power sources for electronic devices, in the United States, Japan and European countries. An ion conductive polymer electrolyte membrane is the most critical constituent element in determining the performance and price of a polymer electrolyte fuel cell or a direct methanol fuel cell.

Polymer electrolyte membranes that are currently in use include perfluorosulfonate ionomer membranes sold under the trademarks Nafion (DuPont), Flemion (Asahi Glass), Aciplex (Asahi Chemical) and Dow XUS (Dow Chemical). However, the high price of the commercial membrane products acts as an obstacle in the practical use of polymer fuel cells as power sources for electricity generation.

In view of the economic burden of the membrane products, research is being actively conducted on relatively inexpensive hydrocarbon polymers (such as polyether ether ketone, polysulfone and polyimide) that can be used in various commercial applications. Each of the hydrocarbon polymers undergoes sulfonation to give an ion conductive polymer, which is then cast into an electrolyte membrane for a fuel cell.

The greatest disadvantages of the hydrocarbon polymers are poor resistance to oxidation and reduction and thermal/mechanical instability. Another disadvantage of the hydrocarbon polymers is poor adhesion to electrodes resulting from excessive swelling in the production of membrane electrode assemblies (MEAs). In an attempt to overcome the above disadvantages, a method has been proposed in which a perfluorinated polymer or a hydrocarbon polymer is impregnated into the pores of a porous support (e.g., Teflon) having excellent mechanical and thermal properties and good oxidation resistance to produce a composite membrane. A representative composite membrane produced by the method is sold under the trade name Gore-select by W.L. Gore & Associates, which has a small thickness of 20 to 40 μm and exhibits superior mechanical and electrochemical properties.

Taking advantage of the excellent characteristics of the composite membrane, various methods have been proposed to produce electrolyte membranes for fuel cells with better performance that can replace Nafion. According to an exemplary method for producing an electrolyte composite membrane, styrene as a hydrocarbon monomer and divinylbenzene as a crosslinking agent are impregnated into a porous support selected from Teflon, polyethylene (PE) and polyvinylidene difluoride (PVDF), followed by crosslinking and sulfonation. According to another exemplary method for producing an electrolyte membrane, acrylsulfonic acid as a monomer and a water-soluble crosslinking agent are impregnated into a suitable porous support, followed by crosslinking.

The electrolyte membrane composed of polystyrene crosslinked with divinylbenzene tends to be fragile in a dry state due to its increased brittleness. Therefore, the electrolyte membrane suffers from mechanical instability when it is intended to form the electrolyte membrane into a thin film or a composite membrane for mass production and to process the electrolyte membrane into an electrode. Further, it is known that the electrolyte membrane composed of crosslinked polyacrylsulfonic acid and filled in the pores of a porous support is not put to practical use in various applications due to its drawbacks, such as poor durability.

DISCLOSURE OF INVENTION

Technical Problem

It is one object of the present invention to provide a highly proton conductive polymer electrolyte composite membrane for a fuel cell which is produced by impregnating highly proton conductive vinylsulfonic acid as a monomer and a highly durable hydroxyl group-containing bisacrylamide as a crosslinking agent into a porous polymer support, polymerizing the monomer, followed by thermal crosslinking or photocrosslinking of the polymer to achieve better physical properties and durability than conventional polymer electrolyte composite membranes.

It is another object of the present invention to provide a method for producing the polymer electrolyte composite membrane and a fuel cell using the polymer electrolyte composite membrane.

Technical Solution

According to one aspect of the present invention, there is provided a polymer electrolyte composite membrane for a fuel cell which includes a porous polymer support and a polymer electrolyte membrane composed of polyvinylsulfonic acid crosslinked with a hydroxyl group-containing bisacrylamide as a crosslinking agent wherein the crosslinking agent is selected from N,N'-(1,2-dihydroxyethylene) bisacrylamide, a bisacrylamide containing at least one hydroxyl group, and a mixture thereof.

In an embodiment, the polymer support may be a hydrocarbon membrane having a porosity of 30 to 60%, a pore size of 0.05 to 0.1 μm and a thickness of 20 to 55 μm.

In a particular embodiment, the polymer electrolyte membrane may be formed from a mixed solution of anhydrous vinylsulfonic acid at a concentration as high as 95%, the crosslinking agent and an initiator. In a more particular embodiment, the anhydrous vinylsulfonic acid, the crosslinking agent and the initiator may be used in amounts of 50 to 90 parts, 10 to 50 parts and 0.1 to 0.5 parts by weight, based on 100 parts by weight of the mixed solution. In a preferred embodiment, the initiator may be used in an amount of 0.2 parts by weight.

The high-concentration anhydrous vinylsulfonic acid improves the ability to exchange ions to increase the ion conductivity of the composite membrane. The use of the vinylsulfonic acid in an amount of less than 50% by weight brings about low ion exchange capacity, resulting in low ion conductivity of the composite membrane. Meanwhile, the use of the vinylsulfonic acid in an amount of more than 90% by weight causes poor durability of the polymer electrolyte membrane. Such phenomena occur for the crosslinking agent. That is, the use of the crosslinking agent in an amount of less than 10% by weight leads to a low degree of crosslinking, causing a decrease in the durability of the polymer electrolyte membrane, while the use of the crosslinking agent in an amount of more than 50% by weight leads to too high a degree of crosslinking, causing a marked decrease in the conductivity of the composite membrane.

In an embodiment, the initiator may be selected from Darocur series and Irgacure series photoinitiators, all of which are manufactured by Ciba Geigy, Switzerland, and N,N'-azobisisobutyronitrile (AIBN) and benzoyl peroxide (BPO) as thermal initiators.

The crosslinking agent for crosslinking the polyvinylsulfonic acid serves to determine the degree of crosslinking of the composite membrane. Therefore, the degree of swelling and the mechanical properties of the composite membrane are dependent on the amount of the crosslinking agent used. No particular limitation is imposed on the kind of the initiator for the polymerization of the monomer.

According to another aspect of the present invention, there is provided a method for producing a highly proton conductive polymer electrolyte composite membrane for a fuel cell, which includes (a) impregnating a mixed solution of vinylsulfonic acid as a monomer, at least one crosslinking agent selected from N,N'-(1,2-dihydroxyethylene)bisacrylamide and a bisacrylamide containing one or more hydroxyl groups and an initiator into a porous polymer support, and (b) laminating the solution impregnated porous support between polyethylene terephthalate (PET) films, followed by photocrosslinking or thermal crosslinking.

In an embodiment, the photocrosslinking may be performed by irradiation with ultraviolet (UV) light having an energy of 1.0 to 7.2 J/cm$^2$. In an embodiment, the thermal crosslinking may be performed in an oven at 110 to 120° C. for 1 to 2 hours. At a temperature lower than 110° C., the polymerization of the monomer is not efficiently initiated and satisfactory thermal crosslinking effects of the polymer cannot be obtained. Meanwhile, problems may arise in the thermal stability of the final membrane at a temperature higher than 120° C.

In an embodiment, the porous polymer support may be made of a hydrocarbon material that is highly resistant to chemicals and oxidation and has good mechanical stability. For example, the hydrocarbon material may be polyethylene, polypropylene, polyimide, polyamideimide, polypropylene oxide, polyethersulfone or polyurethane.

The polymer electrolyte composite membrane produced by the method of the present invention contains a polymer electrolyte composed of polyvinylsulfonic acid crosslinked with the crosslinking agent and may have a thickness of 20 to 55 μm.

According to yet another aspect of the present invention, there is provided a fuel cell including a polymer electrolyte composite membrane produced by the method wherein the composite membrane has a proton conductivity of at least 0.05 S/cm at room temperature and a methanol permeability of 0.28 kg/m$^2$·h or less.

Advantageous Effects

The polymer electrolyte composite membrane of the present invention uses polyethylene (PE) as the porous support to achieve improved mechanical properties. Due to the combined use of vinylsulfonic acid as the monomer and a hydroxyl group-containing bisacrylamide as the crosslinking agent, the polymer electrolyte composite membrane of the present invention has higher ion conductivity and better durability than the prior art composite membrane using an electrolyte composed of polystyrene crosslinked with divinylbenzene or an electrolyte composed of crosslinked polyacrylsulfonic acid.

According to the method of the present invention, the polymer electrolyte composite membrane can be produced in a simple manner. In addition, the small thickness of the polymer electrolyte composite membrane reduces the production cost. Furthermore, development of a new method for the continuous production of the polymer electrolyte composite membrane can be expected.

MODE FOR THE INVENTION

The performance characteristics of a polymer electrolyte composite membrane produced in Example 1 and an ion exchange membrane of Comparative Example 1 were tested and evaluated as described below.

1. Tensile Strength

The tensile strengths (kpsi) of the membranes of Example 1 and Comparative Example 1 were measured in accordance with the method described in ASTM 882.

2. Proton Conductivity

Each of the membranes of Example 1 and Comparative Example 1 was dipped in distilled water at 25° C. for 1 hour and was then interposed between two glass substrates, to which a rectangular platinum electrode was fixed, without removing water from the surface. The alternating current impedance of the membrane was measured at 100 Hz-4 MHz to determine the proton conductivity of the membrane.

3. Methanol Permeability

Figure 1:
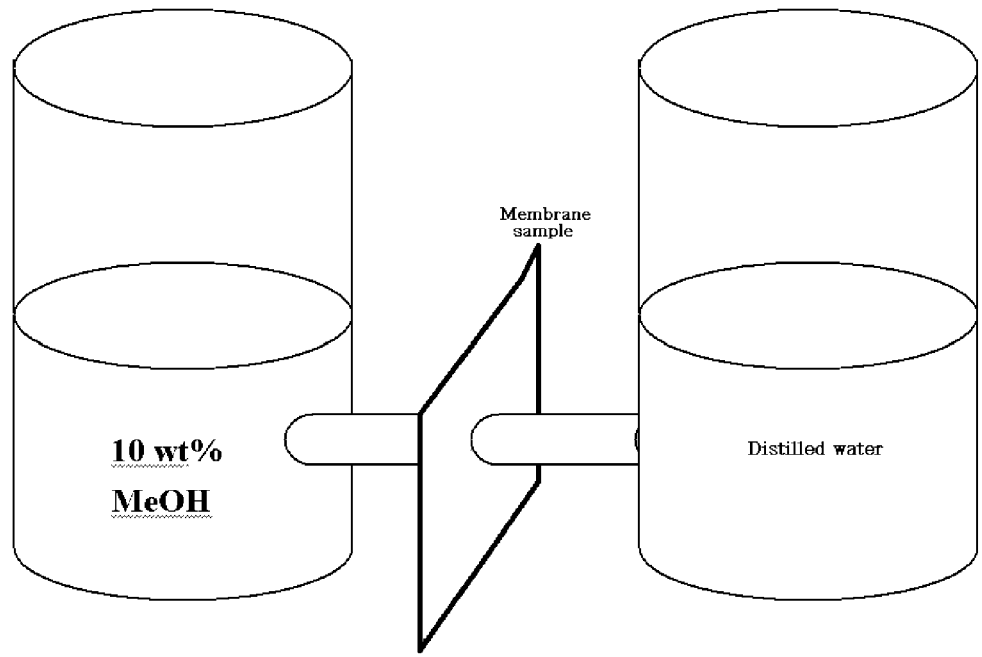
FIG. 1 is a schematic view of an apparatus for measuring the methanol permeability of a polymer electrolyte membrane produced in Example 1 and an ion exchange membrane of Comparative Example 1.

The membrane sample was mounted in a methanol permeability tester illustrated in FIG. 1. A 10 wt % methanol solution and distilled water were put in independent containers located at the left and right sides of the membrane sample. The methanol migrated toward the distilled water container through the membrane sample with the passage of time. After standing at room temperature for 2 hours, a portion of the distilled water was taken from the distilled water container, followed by gas chromatography to calculate the methanol permeability ($kg/m^2 \cdot h$) of the membrane.

4. Performance of Fuel Cells

Direct methanol fuel cells (DMFCs) were fabricated using the membranes of Example 1 and Comparative Example 1. Specifically, each of the membranes was joined to a fuel electrode containing PtRu/C (3 $mg/cm^2$) and an air electrode containing Pt/C (1 $mg/cm^2$) to construct a membrane electrode assembly (MEA) having an effective area of 5 $cm^2$. The membrane electrode assembly was mounted on an apparatus for evaluating the performance of a unit cell. A 1 M methanol solution and air were allowed to flow at rates of 1 ml/min and 50 ml/min through the fuel electrode and the air electrode at 60° C., respectively, to determine the performance of the fuel cell.

On the other hand, proton exchange membrane fuel cells (PEMFCs) were fabricated using the membranes of Example 1 and Comparative Example 1. Specifically, each of the membranes was joined to a fuel electrode containing Pt/C (0.4 $mg/cm^2$) and an air electrode containing Pt/C (0.4 $mg/cm^2$) to construct a membrane electrode assembly (MEA) having an effective area of 5 $cm^2$. The membrane electrode assembly was mounted on an apparatus for evaluating the performance of a unit cell. Hydrogen and oxygen under fully humidified conditions were allowed to flow at rates of 100 ml/min through the fuel electrode and the air electrode at 70° C., respectively, to determine the performance of the fuel cell.

Hereinafter, the present invention will be explained in detail with reference to the following examples and accompanying drawings.

EXAMPLES

Example 1

Anhydrous vinylsulfonic acid at a concentration of at least 95% and N,N'-(1,2-dihydroxyethylene)bisacrylamide were mixed in a weight ratio of 80:20 with stirring. 100 parts by weight of the mixed solution was mixed with 1 part by weight of a dilution of Darocur 1173 (10 wt %) in methanol.

Thereafter, the solution was sufficiently impregnated into a porous polyethylene support (thickness=30 μm, pore size=0.07 μm and porosity=40%). The solution impregnated porous support was interposed between polyethylene terephthalate (PET) films and irradiated with ultraviolet (UV) light having an energy of 30-150 $mJ/cm^2$ to produce a composite membrane.

After completion of the polymerization and crosslinking, the PET films were separated from the composite membrane and by-products were removed from the surface of the composite membrane. The clean composite membrane was washed several times with ultrapure water.

The tensile strength, proton conductivity and methanol permeability of the composite membrane were measured by the respective methods described above. The obtained results are shown in Table 1.

Comparative Example 1

In this example, a commercially available ion exchange membrane (Nafion 117 or 112, DuPont, U.S.A.) was used. The tensile strength, proton conductivity and methanol permeability of the membrane were measured by the respective methods described above. The obtained results are shown in Table 1.

TABLE 1

<Performance characteristics of the membranes of Example 1 and Comparative Example 1>

| Performance | Example 1 | Comparative Example 1 (Nafion 117 or 112) |
|---|---|---|
| Tensile strength (kpsi) | 23.0 (MD) | 6.3 (MD) |
|  | 20.0 (TD) | 4.7 (TD) |
| Proton conductivity (S/cm) | 0.22 | 0.08 |
| Methanol permeability ($kg/m^2 \cdot h$) | 0.12 | 0.28 |

MD: Machine direction TD: Transverse direction

From the results in Table 1, it can be known that the polymer electrolyte composite membrane produced in Example 1 had much higher proton conductivity than the commercial membrane of Comparative Example 1.

Further, the polymer electrolyte composite membrane produced in Example 1 had a higher tensile strength than the membrane of Comparative Example 1. The methanol permeability of the polymer electrolyte composite membrane produced in Example 1 was less than one half of that of the membrane of Comparative Example 1. These results suggest that the membrane produced in Example 1 can be used for the fabrication of environmentally friendly hydrocarbon fuel cells in a continuous manner at low cost on an industrial scale instead of the commercial membrane of Comparative Example 1.

Figure 2:
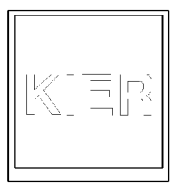
FIG. 2 shows changes in the state of a polymer electrolyte composite membrane produced in Example 1 during crosslinking.
Figure 2:
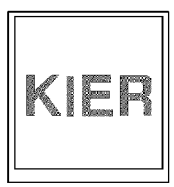
Figure 2:

Particularly, FIG. 2 confirms that the polymer electrolyte composite membrane of Example 1 became transparent and was not dissolved in most organic solvents after completion of crosslinking with the crosslinking agent.

Specifically, FIG. 2 shows changes in the state of the polymer electrolyte composite membrane of Example 1 before (2a) and after (2b) crosslinking with N,N'-(1,2-dihydroxyethylene)bisacrylamide as the crosslinking agent.

Figure 3:
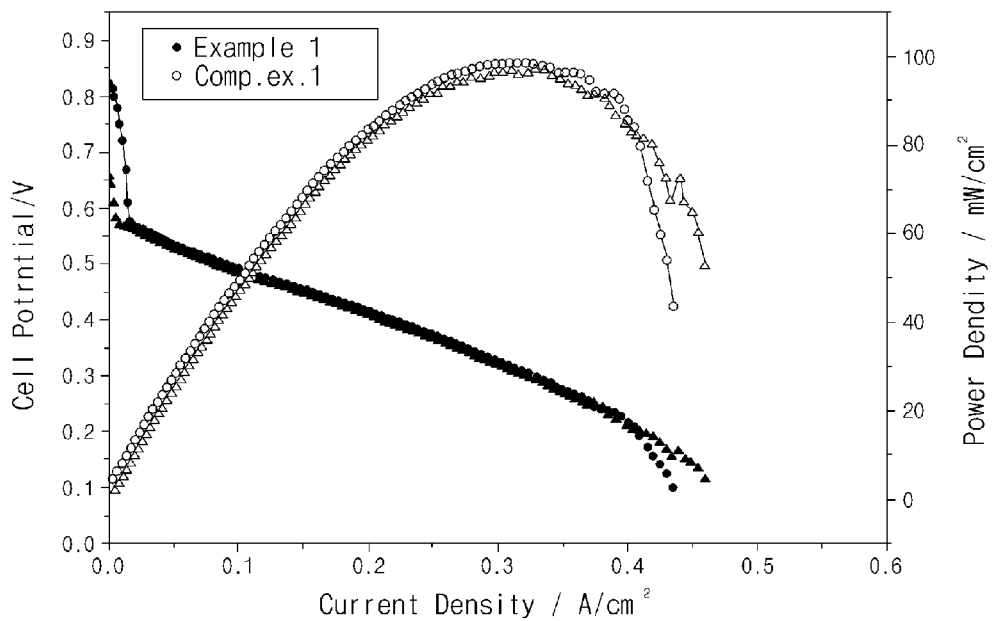
FIG. 3 is a graph showing the performance characteristics of direct methanol fuel cells (DMFCs) using a polymer electrolyte composite membrane produced in Example 1 and an ion exchange membrane of Comparative Example 1.

FIG. 3 is a graph showing the performance characteristics of the direct methanol fuel cells (DMFCs) using the membranes of Example 1 and Comparative Example 1.

Referring to FIG. 3, the DMFC using the membrane of Example 1 showed excellent characteristics in terms of cell potential, current density and power density, compared to the DMFC using the Nafion 117 membrane. These results indicate that the use of the polymer electrolyte composite membrane of Example 1 can contribute to an improvement in the performance of fuel cells.

Figure 4:
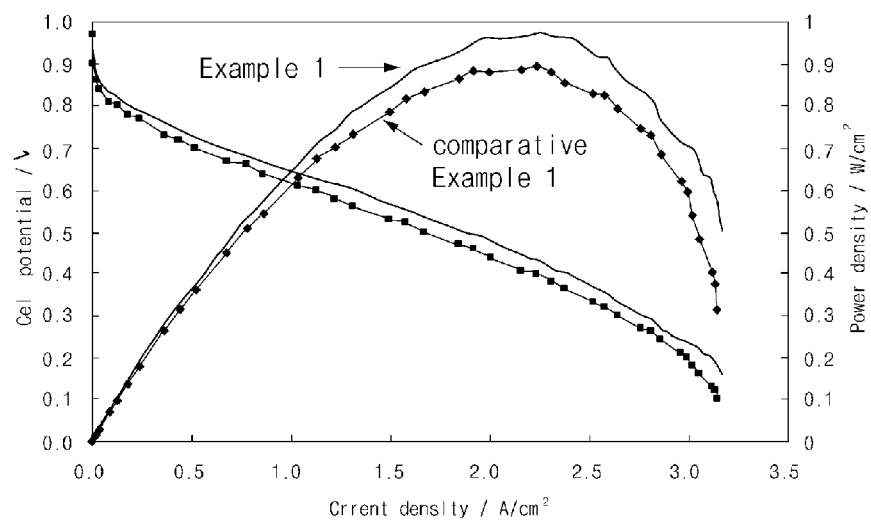
FIG. 4 is a graph showing the performance characteristics of proton exchange membrane fuel cells (PEMFCs) using a polymer electrolyte composite membrane produced in Example 1 and an ion exchange membrane of Comparative Example 1.

FIG. 4 is a graph showing the performance characteristics of the proton exchange membrane fuel cells (PEMFCs) using the membranes of Example 1 and Comparative Example 1.

Referring to FIG. 4, the PEMFC using the membrane of Example 1 showed excellent characteristics in terms of cell potential, current density and power density, compared to the PEMFC using the Nafion 112 membrane. These results indicate that the use of the polymer electrolyte composite membrane of Example 1 can contribute to an improvement in the performance of fuel cells.

The invention claimed is:

1. A polymer electrolyte composite membrane for a fuel cell, comprising a porous polymer support and a polymer electrolyte membrane composed of polyvinylsulfonic acid crosslinked with N,N'-(1,2-dihydroxyethylene)bisacrylamide, wherein the composite membrane has a proton conductivity of 0.22 S/cm at room temperature and a methanol permeability 0.12 kg/m$^2$ h or less.

2. The composite membrane of claim 1, wherein the polymer support is a hydrocarbon membrane having a porosity of 30 to 60%, a pore size of 0.05 to 0.1 μm and a thickness of 20 to 55 μm.

3. The composite membrane of claim 1, wherein the polymer electrolyte membrane is formed from a mixed solution of 50 to 90 parts by weight of anhydrous vinylsulfonic acid at a concentration as high as 95%, 10 to 50 parts by weight of the crosslinking agent and 0.1 to 0.5 parts by weight of an initiator.

4. The composite membrane of claim 3, wherein the initiator is selected from N,N'-azobisisobutyronitrile (AIBN) and benzoyl peroxide (BPO) as thermal initiators.

5. A method for producing a highly proton conductive polymer electrolyte composite membrane for a fuel cell, the method comprising (a) impregnating a mixed solution of vinylsulfonic acid as a monomer, with crosslinking agent N,N'-(1,2-dihydroxyethylene)bisacrylamide and an initiator into a porous polymer support, and (b) laminating the solution impregnated porous support between polyethylene terephthalate (PET) films, followed by photocrosslinking or thermal crosslinking, wherein the composite membrane has a proton conductivity of 0.22 S/cm at room temperature and a methanol permeability 0.12 kg/m$^2$ h or less.

6. The method of claim 5, wherein the photocrosslinking is performed by irradiation with ultraviolet (UV) light having an energy of 30 to 150 mJ/cm$^2$.

7. The method of claim 5, wherein the thermal crosslinking is performed in an oven at 110 to 120° for 1 to 2 hours.

8. The method of claim 5, wherein said vinylsulfonic acid is present at 50 to 90 parts by weight and said crosslinking agent is present at 10 to 50 parts by weight.

* * * * *